(12) United States Patent
Richelson et al.

(10) Patent No.: US 9,317,844 B2
(45) Date of Patent: Apr. 19, 2016

(54) SYSTEM AND METHOD FOR REMOTE MANAGEMENT OF SALE TRANSACTION DATA

(75) Inventors: Jason Richelson, New York, NY (US); Bill Walton, Fort Worth, TX (US)

(73) Assignee: ShopKeep.com, Inc., New York, NY (US)

( * ) Notice: Subject to any disclaimer, the term of this patent is extended or adjusted under 35 U.S.C. 154(b) by 0 days.

(21) Appl. No.: 13/037,048

(22) Filed: Feb. 28, 2011

(65) Prior Publication Data

US 2011/0218872 A1 Sep. 8, 2011

Related U.S. Application Data

(60) Provisional application No. 61/309,678, filed on Mar. 2, 2010.

(51) Int. Cl.
*G06Q 50/00* (2012.01)
*G06Q 20/20* (2012.01)

(52) U.S. Cl.
CPC .............. *G06Q 20/20* (2013.01); *G06Q 20/206* (2013.01)

(58) Field of Classification Search
None
See application file for complete search history.

(56) References Cited

U.S. PATENT DOCUMENTS

| | | |
|---|---|---|
| D401,231 S | 11/1998 | Schechtman et al. |
| 6,088,682 A * | 7/2000 | Burke .............................. 705/17 |
| D436,580 S | 1/2001 | Navano et al. |
| 6,441,808 B1 | 8/2002 | Hashimoto |
| 7,171,370 B2 * | 1/2007 | Burke .............................. 705/16 |
| 7,353,183 B1 * | 4/2008 | Musso .......................... 705/7.21 |
| 7,697,920 B1 * | 4/2010 | McClain ........................ 455/411 |
| 8,099,727 B2 * | 1/2012 | Bahat et al. .................... 717/168 |
| D656,946 S | 4/2012 | Judy et al. |
| D657,368 S | 4/2012 | Magee et al. |
| 8,195,656 B2 * | 6/2012 | Grasset ......................... 707/732 |
| D667,838 S | 9/2012 | Magee et al. |
| D673,165 S | 12/2012 | Ospina Gonzalez |
| D678,306 S | 3/2013 | Philopoulos |
| D682,855 S | 5/2013 | Iden |
| D689,086 S | 9/2013 | Philopoulos |
| D690,721 S | 10/2013 | Tee et al. |
| 8,646,685 B2 * | 2/2014 | Bishop et al. .................. 235/379 |
| 2006/0031237 A1 * | 2/2006 | DeAnna et al. ................ 707/100 |
| 2006/0258337 A1 * | 11/2006 | Fujita et al. ................. 455/414.1 |
| 2010/0106651 A1 * | 4/2010 | Tate ................................ 705/80 |
| 2010/0125509 A1 * | 5/2010 | Kranzley et al. ................ 705/17 |
| 2010/0198728 A1 * | 8/2010 | Aabye et al. .................... 705/44 |
| 2011/0225055 A1 | 9/2011 | Takahashi |
| 2011/0251892 A1 * | 10/2011 | Laracey ..................... 705/14.51 |
| 2012/0066363 A1 * | 3/2012 | Somogyi et al. .............. 709/223 |
| 2012/0160912 A1 * | 6/2012 | Laracey ......................... 235/379 |

\* cited by examiner

*Primary Examiner* — Fateh M Obaid

(74) *Attorney, Agent, or Firm* — Ted Sabety, Esq.; Sabety + Associates PLLC

(57) ABSTRACT

This invention discloses a novel system and method for providing retail point of sale terminals that are connected securely over the Internet to a back-office service that manages the retailer's data as a service using a system that supports more than one retailer, each of which will have one or more point of sale terminals.

19 Claims, 15 Drawing Sheets

Register Activation

Enter the information below to activate this register.

Subdomain: [_____] .shopkeepapp.com

Register number to activate: [__]

Manager Name: [_____] (case sensitive)

Manager Signin: [_____]

[ Activate ]   [ CANCEL ]

Figure 6

Walk-in

ADD NEW CUSTOMER    CHANGE CUSTOMER

Cash Tender

Sale Amount:      21.75
Discount:         0.00
Tax:              1.93

Total Amount Due:    23.68

Amount tendered: [    ]

SUBMIT    CANCEL

| 1 | 2 | 3 |
| 4 | 5 | 6 |
| 7 | 8 | 9 |
|   | 0 | CLEAR |

Figure 10

| END SHIFT | CASH MANAGEMENT INFO | |
|---|---|---|
| | OPENING AMOUNT: | 100.00 |
| DROP / PAYOUTS | CASH SALES: | 0.00 |
| | DROPS / PAYOUTS: | (0.00) |
| NO SALE | EXPECTED DRAWER: | 100.00 |
| | ACTUAL DRAWER: | 0.00 |
| GET UPDATES | OVER/SHORT: | 0.00 |

Figure 13

SYSTEM AND METHOD FOR REMOTE MANAGEMENT OF SALE TRANSACTION DATA

PRIORITY CLAIM

This application claims priority as a non-provisional continuation to U.S. Patent Application No. 61,309,678 filed on Mar. 2, 2010 which is herein incorporated by reference.

FIELD OF INVENTION

This invention is related to point of sale systems typically used in retail stores. The invention is a novel architecture that permits a retail store owner to obtain sale transaction data management as a service instead of purchasing such a system and maintaining it.

BACKGROUND

In typical point of sale systems for retail stores, a set of special purpose computers are positioned at the retail checkout locations. These are locally networked with a server located at the site of the retail store. For many retail stores, this requires a level of system maintenance responsibility that is beyond the staff capabilities of the retailer or too costly. In this invention, the point of sale system is designed so that it is provided as a service shared among participating retail vendors. With this kind of an architecture, the invention provides the service security, data integrity, robustness and redundancy.

This invention relates to a system and method for executing sale transactions and managing the data associated with the transaction, for example, pricing and inventory. Typical point-of-sale systems have dedicated point of sale devices that are connected over a local area network to a local server computer dedicated to that specific vendor's system. Other systems use credit card readers that are connected by a wide are network to a system that clears the transaction, but the actual sale transaction data is managed using the dedicated system. In general, these dedicated systems are costly to buy and maintain. As a result, there is a need for a sale transaction data management system that can be shared by more than one vendor and offered as a service to these vendors, rather than a system that each vendor has to own and maintain.

DESCRIPTION OF THE FIGURES

FIG. 6 is a typical user interface to activate the Register software.

FIG. 10 shows the transaction invoice sheet.

FIG. 13 shows the display for a credit card transaction.

DETAILED DESCRIPTION OF THE PREFERRED EMBODIMENTS

Figure 1:
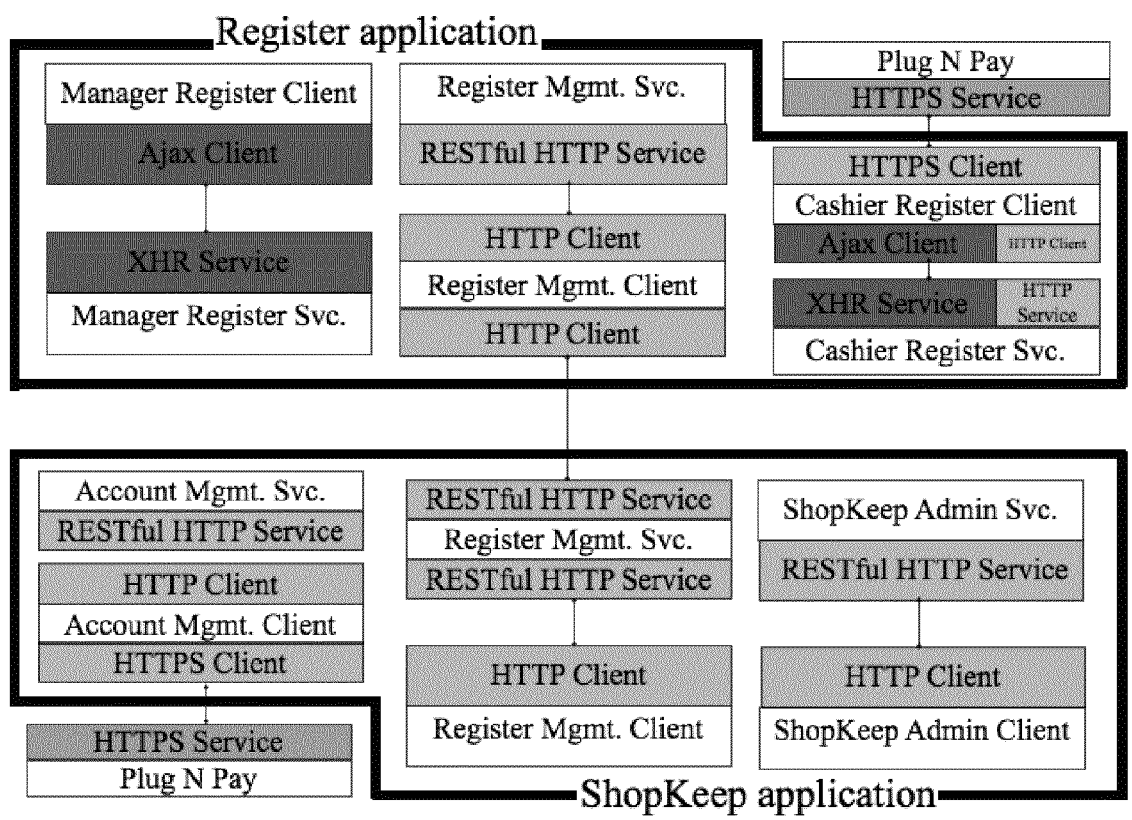
FIG. 1. Schematic of basic system architecture.

The typical embodiment of the system is centered around one or more servers that are hosted externally from the point of sale locations of the one or more vendors that use the system. Typically the servers are connected to the Register instances over a Wide Area Network, typically the Internet. A server is a computer containing or operatively connected, through a data network, one or more mass storage devices. The servers operate together as the repository of vendor information associated with the point of sale terminals. In the preferred embodiment, the terminals are typical personal computers operating an instance of the Register software. The servers are operatively connected to the point of sale terminals over a data network, a wide area network. In one embodiment, the Internet is the wide area network. The servers are accessed in several ways. The primary access is by means of the point of sale terminals. However, the servers are accessible from the Internet by other computers as well. The point of sale terminals is typically a personal computer running a typical operating system, for example, Windows™. In the preferred embodiment, a point of sale terminal is created by means of operating the Register software on a personal computer running Windows™.

Register Software Instance: Each computer at a point of sale location that acts as the transaction input interface or terminal is a typical personal computer running an instance of the point of sale software, or Register software. The Register software is designed to execute particular protocols that cause communication between the Register software instance and the servers. The protocol is designed to ensure that the Register software has access to that part of the database hosted by the servers associated with the vendor whose Register terminal is making the access. In this architecture, each Register instance communicates across the wide area network, including the Internet to the servers housing the database information associated with the vendor. In addition, the Register software is designed so that where a vendor has more than one terminal operating the Register software, the specific instance of Register that is accessing the server is identifiable by the database.

When the Register software is installed on a personal computer, the system operating on the servers execute a protocol to verify that the software has not been tampered with. In one embodiment, the Register software installs itself and then runs various checksums on the executable code modules that it uses. These check sum values are transmitted to the servers using a protocol that isolates the Register software instance from a specific vendor's database and instead has it interact with the service administrative engine. The administrative engine checks the check sum values and then issues an authenticating key or keys when these values are found to be correct. The authenticating key or keys can be a unique pair of numbers, which are a login and password. The login and password can be hashes of the service customer identity or other information stored only on the back office server.

Each instance of the Register software is also tied to the specific machine it has been installed on: The software, on installation, can recover hardware information to use as a seed for digitally signing various code components or generating encryption keys during installation. The seed values can include the CPU chip serial number, a serial number off of the hard drive, the MAC address from the network card, or a unique number derived from the layout of data on the hard drive. The software, when operating, uses these values to ensure that the code is operating on the machine it is intended for. The back-office administrative software operating on the server checks that the Register software instance that has been installed and is communicating with the server meets the authentication requirements. During the activation process, the authorized vendor representative, referred to as a manager, inputs a user name and password, subdomain for that customer and the register number to be assigned to that Register instance for that vendor-customer. The sub-domain is that part of the server database that is assigned to the vendor-customers. The back office server checks that the manager's user name, password and subdomain match up with the same entries in the back office database records associated with the vendor customer. Once verified, the Register is considered activated and a back office login identifier, which in one embodiment is the login identifier and password are downloaded to the Register. These two items are used by the Register software instance to communicate securely with the back office servers for that subdomain, that is, the subdomain assigned to the vendor-customer of the service. The Register's login identifier, which in one embodiment is a login and password are used with each request sent up to the back office server so that it can authenticate each request from that Register instance and to map it to the correct subdomain. The system assigns a login identifier, which in one embodiment is a login and password to each Register instance when the vendor-customer sets up the register. When the Register software is activated, that data is downloaded to the register and that is used by Register to access the system database. At that point, that instance of the Register software is authorized to access the subdomain of the database in the back office associated with the vendor-customer whose manager activated the Register instance.

Once the Register software has been securely installed on a machine, the vendor personnel can use it to connect to their specific database operating on the server. An authorized vendor personnel is prompted to input the vendor identity, a user name and password to log in as the operator for the cash register station.

On first log-in, the server will obtain a registration key from the administrative engine and a password input into the Register software that is transmitted up to the server during the first log-in process. The vendor user who knows this password can activate the instance of the Register software. In this way, the installed instance of the Register software is associated with a particular customer of the service. In one embodiment of the invention, the Register software does not save this master password. Instead, a secure browser session is opened to the back office server at the same time as the Register software instance is attempting to be activated. The back office servers check that the IP address of the browser session where the master password has been input matches the IP address associated with the Register software instance.

Once the Register software is authenticated, the server software component will then associate in the vendor's database that specific Register instance with the vendor's account. In addition, the server software will create a data record associated with that instance of Register that is then populated with data that the vendor wants, for example, the store location, or location in the store that the terminal occupies. If the vendor already has inventory data and price data in the database that the Register terminal must have, the system will automatically transmit the data down to the new Register terminal so that a copy is stored on that terminal on its mass storage device. In this manner, each Register terminal has a copy of the necessary inventory, pricing and transaction information.

Once the Register instance has been initialized, the retail store personnel can use it to tally sales. The Register software presents a browser type interface with a user-customizable series of interactive screens that present the workflow typically used by that vendor. When a sale is made, the Register system looks in its local mass storage for the pricing associated with the unit sold.

At that point a transaction ticket is created, meaning a data object representing the transaction. That ticket contains a Register identifier, personnel identifier, item number, price and any other information the vendor has decided to associate with the transaction. The transaction ticket is transmitted to the server in conformance with the interactive protocol with the server.

When a transaction occurs on the Register, it pushes that information up to the back office server. The Register software contains several components that permit it to act as its own file server, database server and browser. The reason is that this provides simple robustness when the network connection over the WAN or Internet is down. The Register software maintains its own local database that mirrors the essential information present on the system server relevant to that Register license. When the system server is updated with new data for that vendor, where that Register instance is implicated, the server causes the database update to be transmitted down to the Register instance so that its database is updated. Likewise, the local database holds the transaction tickets. These are also transmitted to the system server when the network connection is re-established. As the transactions are processed by the system server, the status is updated both on the system server and the local Register software database. In one embodiment, the system does a data consistency check to be sure that the latest pricing and inventory data has been updated in the Register instance and that the latest transaction data in the Register has been updated in the back-office server database. When a work shift is opens on a given Register software instance, the Register software requests updates from back office system servers.

In one embodiment, the protocols between the Register software and the system server initiates the protocol connection. In the preferred embodiment, Ruby library for Network connectivity and HTTP communication protocols are used. In the preferred embodiment, all communication between the Register software and the system servers uses HTTPS and SSL, without caching and for encrypted transmission.

An activated Register software instance is ready to be used during each work shift. To launch a shift, a user, typically the employee manning the retail customer checkout, logs into the Register software. This user has a user name and password or login ID. These have been generated by the person with Manager authority directly logging into the back office database and entering the user and password or login ID into the database as an authorized user.

The user name and password or login ID are sent to the back office for verification. As noted below, each transaction with the back office includes the login and password for the Register software instance. This pair has been generated by the back office server on activation and is associated with the service customer associated with the activation of the Register software. Therefore, the user name and password are checked in the database of authorized users associated with that service customer. The mapping process takes the Register login and password, selects the sub-domain associated with that login and password, checks the password, then looks in that sub domain authorized user list for the user name and then checks the user password. In another embodiment, the user has a key generating hardware device, that periodically generates a new password. The user can type this number into the Register, which passes it up to the back office for verification.

When the user has been authenticated, the user is prompted to input the contents of the cash drawer. This information is transmitted to the back office. The Register software instance also downloads any updates to the inventory count, new authorized user names and any other information that is needed to update the Register instance. In one embodiment, the credit card transaction processing password information is not permanently stored on the Register computer. Instead, it is downloaded from the subdomain of the database each time a shift is started. Therefore, the Register instance, when the shift is started and the user verified, receives the credit card transaction processing password anew. By this means, each opening of the Register for a new shift results in a check with the back office to get permission to run credit card transactions.

If the Register closed, the publisher password for credit card processing is deleted. When opened again it is sent back down to the Register. In one embodiment a new publisher password is created for each shift. In another embodiment, the same password is used, but it is freshly encrypted by the back office server at each shift and the encrypted version is sent down with a new decryption key. In another embodiment, the Register has to receive the credit card processing password with each credit card transaction. In another embodiment, the credit card transaction is passed up to the back office server and the back office server processes the credit card transaction and returns confirming transaction data to the Register.

When the local Register is deactivated, the local database is erased. In one embodiment, the Register checks whether the data has been uploaded to the back office server and warns the user before the user commits to deactivating the Register instance. Once the Register instance is deactivated, the back office deletes the Register login and password from the list of authorized Register instances.

When the Register is suspended at the end of a shift, any data not uploaded to the back office server is uploaded. If the back office server is unavailable, the data is stored locally and queued for such uploading once a connection is reestablished.

Additional Security Protocols.

In other embodiments, additional security protocols may be used.

1. The manager level user has the power to log into the back office sub-domain associated with the vendor-customer of the service and deactivate a particular Register instance. The manager can use a browser to securely log into the database. The database server can operate scripts to prevent the data associated with the vendor-customer. When that occurs, the Register login and password associated with that Register instance is deleted from the list of authorized Register login and password pairs.

2. The back office is notified by the Register instance when it is activated for a new shift. The system stores in the database the date and times those new shift activations occur. The back office system can be set with a trigger so that if a particular Register instance wakes up for a new shift during a predetermined black out period, that Register is automatically deactivated by the back office server systems.

3. In another embodiment, the back office system transmits a encryption and decryption key pair to be used for a particular session with a particular Register instance. This pair is delivered when the Register wakes up for a new shift and transmits a notification to the back office server. This shift key pair is used to authenticate requests with the back office subdomain for that Register for that shift.

In addition, the key pair can be used to transmit an encrypted version of the credit card processing login and password information. Furthermore, the shift key decryption key can be used to obtain the key for decrypting the critical credit card processing code modules in the Register software. At the end of the shift, when the Register is changed to a new shift or is set to sleep, the shift key for that expired shift is deemed invalid by the back office server.

Architecture

FIG. 1 shows the basic architecture of the Register instance operating on the point of sale computer. A locally run webserver service is operated as Localhost:3000. Everything in that box is the local server operation operating as a service to the other applications. Customers, items for sale, employees with login and passwords, returns and vouchers, e.g. store coupons are accessed through the locally operated web server.

Figure 2:
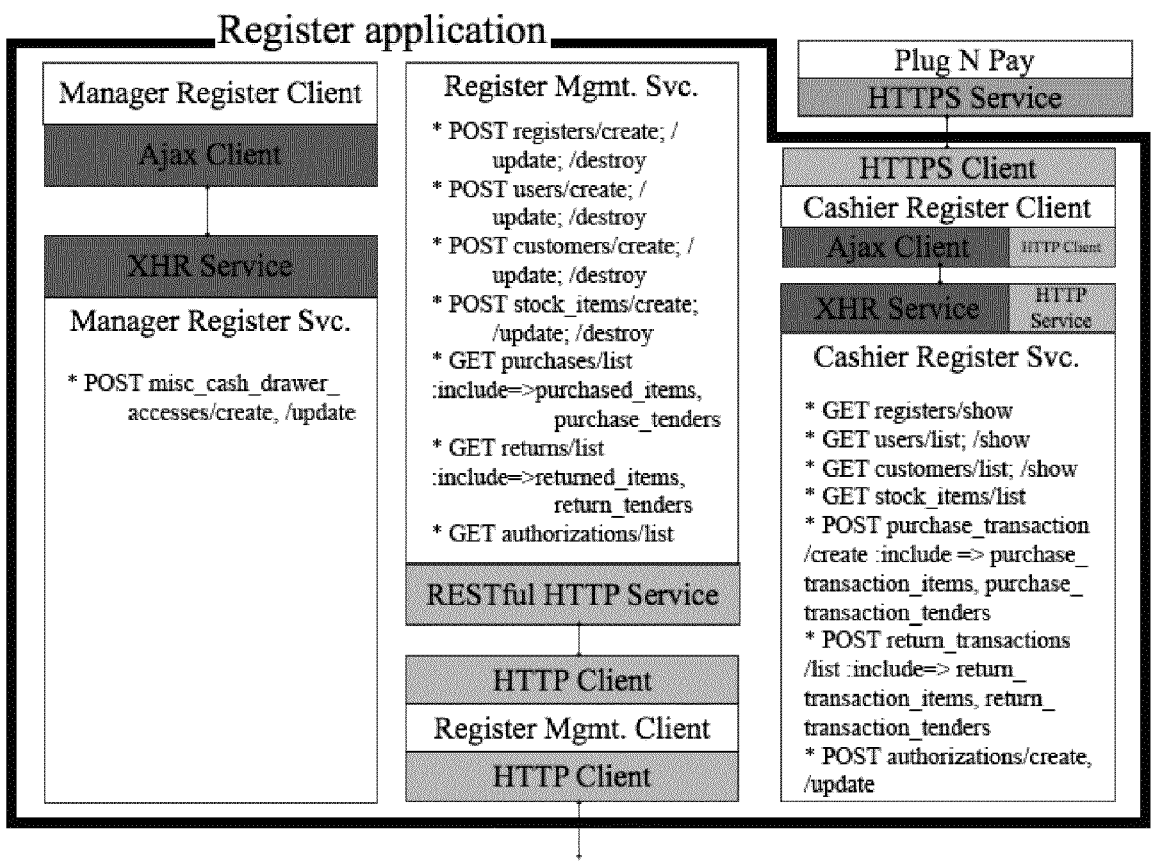
FIG. 2. Schematic of Register software architecture.

FIG. 2 shows more detail of the Register instance.

Manager Register Client. This component allows the Register instance to be opened or closed. The person with Manager level security access can access this component.

Cashier Register Client is how the cashier operating the point of sale accesses the system. This is through the browser that accesses the localhost 3000 service. The Cashier logs in and only gets access to the cashier services.

Register Management Service: This is a back-office component that allows authorized persons to update items, customers, and activates and deactivates the registers. To bring on a cashier as an individual, the vendor-customer must log into the back office to add that person, by inputting a user id and password for that person. The Manager register client would talk to the XHR, which would then talk to the Register Management Service to update the authorized employees. At that point the Register instance gets authentication for the new cashier from the back office.

However, to get such authentication, a person with seniority logs into the back office directly using a browser, and then opens the employees tab to add the new employee. That way, when the manager updates a Register instance to authorize the new cashier, that cashier is already found in the back-office database.

Figure 3:
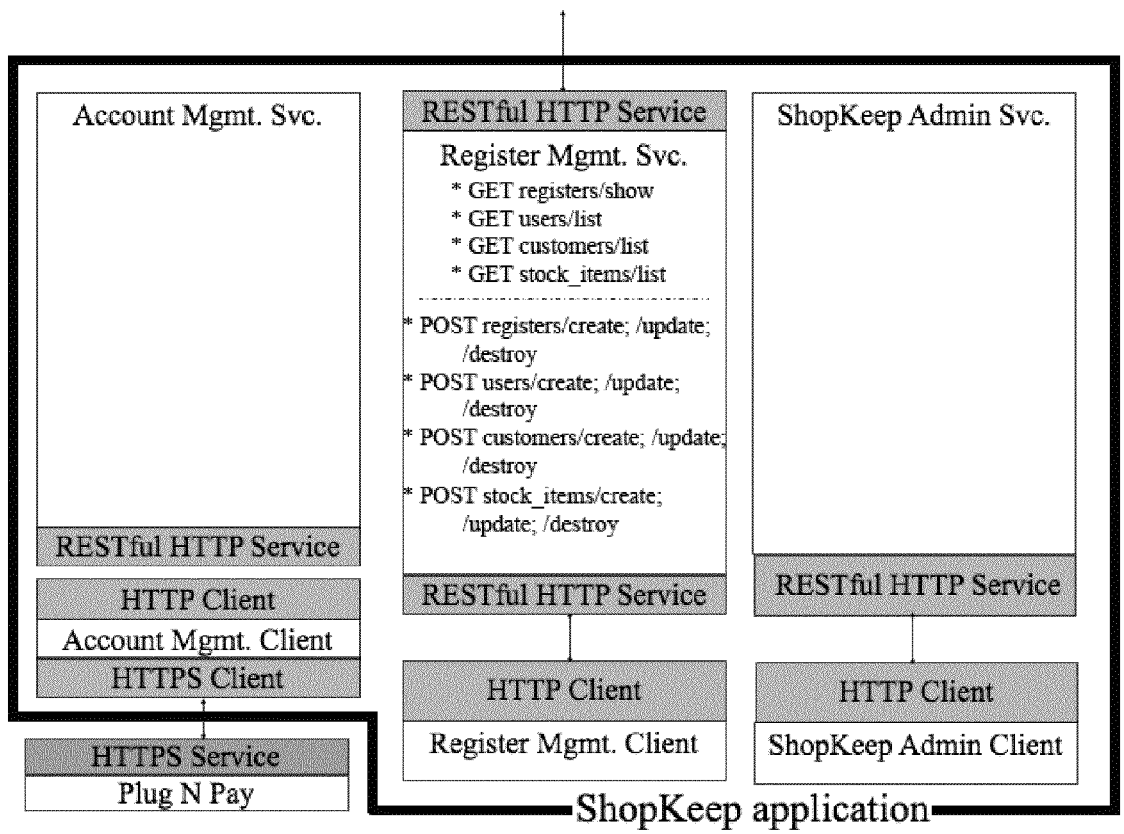
FIG. 3. Schematic of Server back office architecture.
Figure 4:
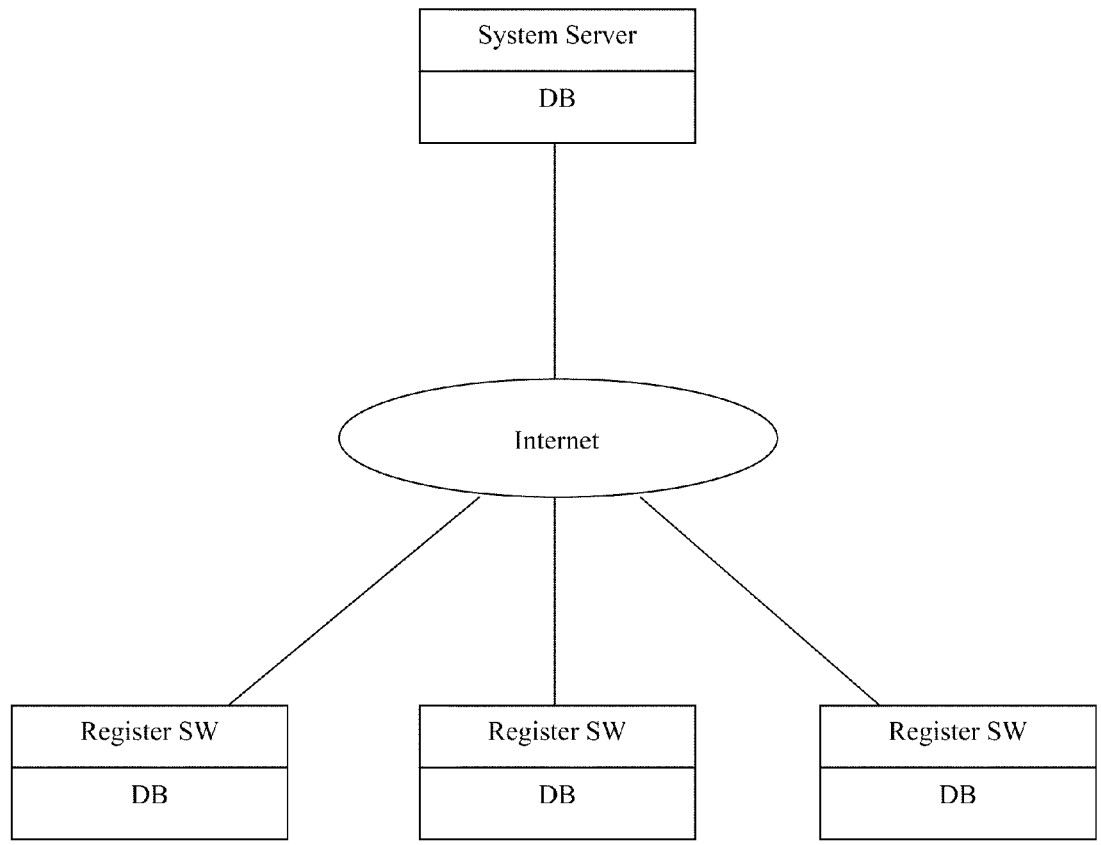
FIG. 4. Schematic of Network topology.
Figure 5:
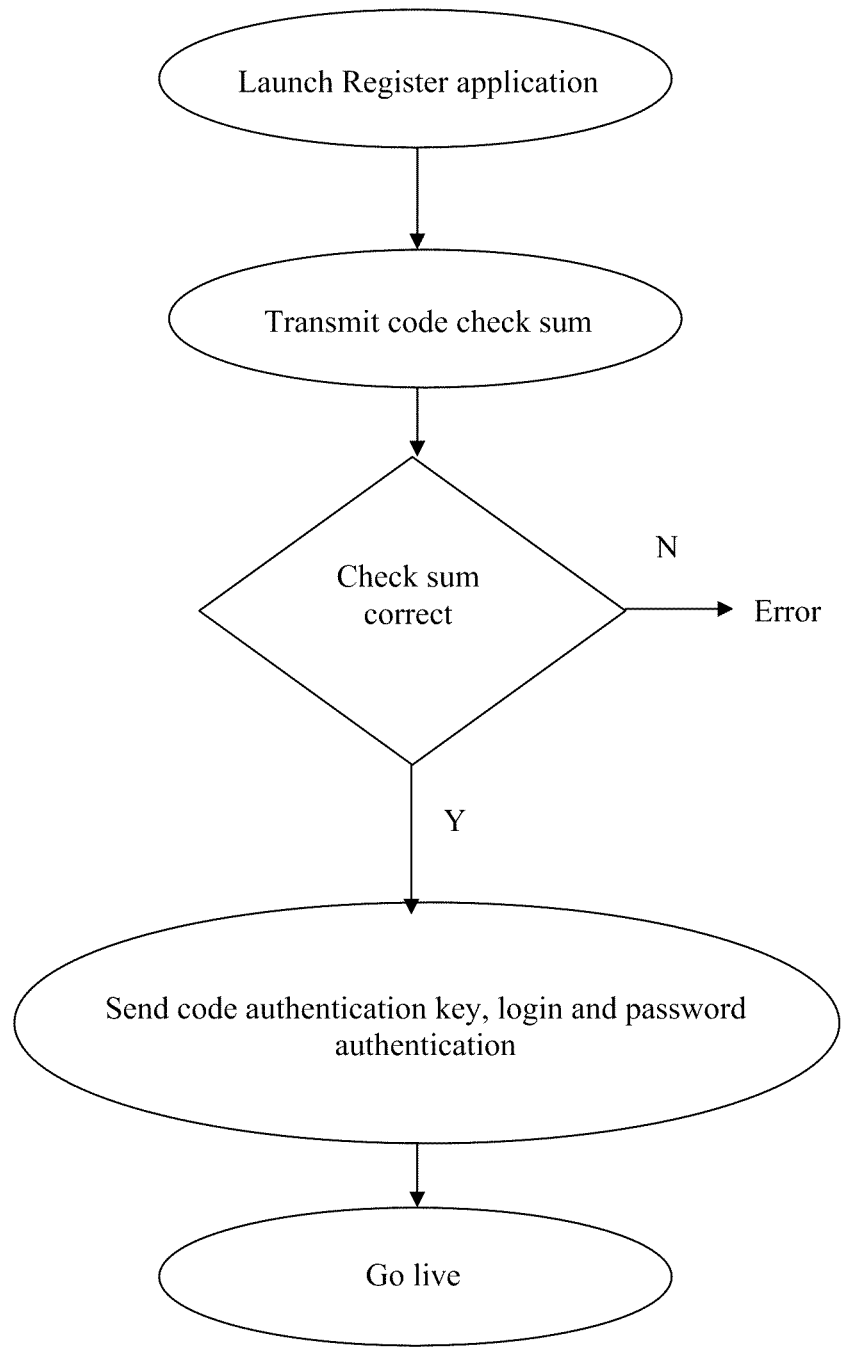
FIG. 5. Flow chart for Register launch.
Figure 7:
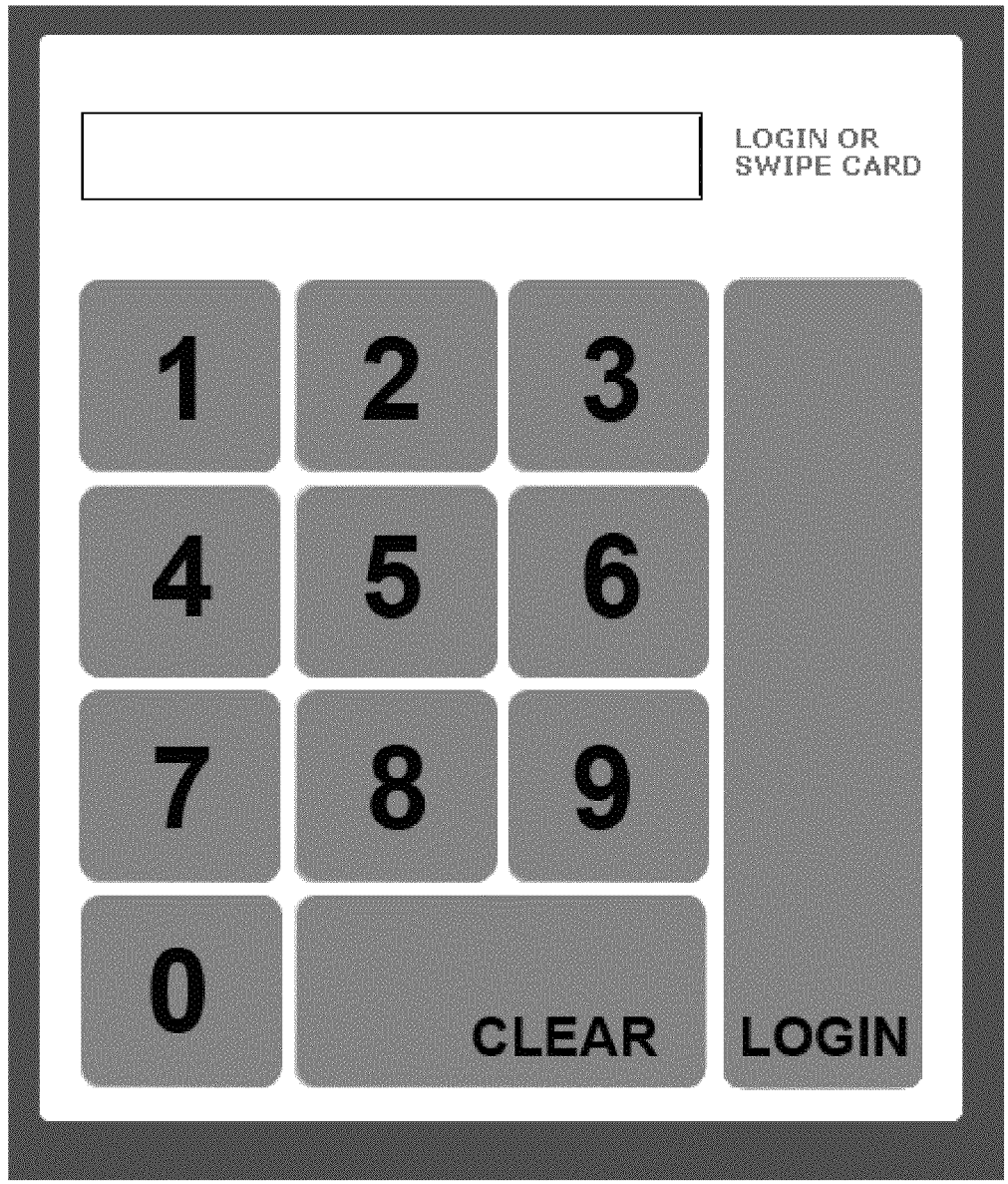
FIG. 7 is the log-in user interface for starting a shift using the Register.
Figure 8:
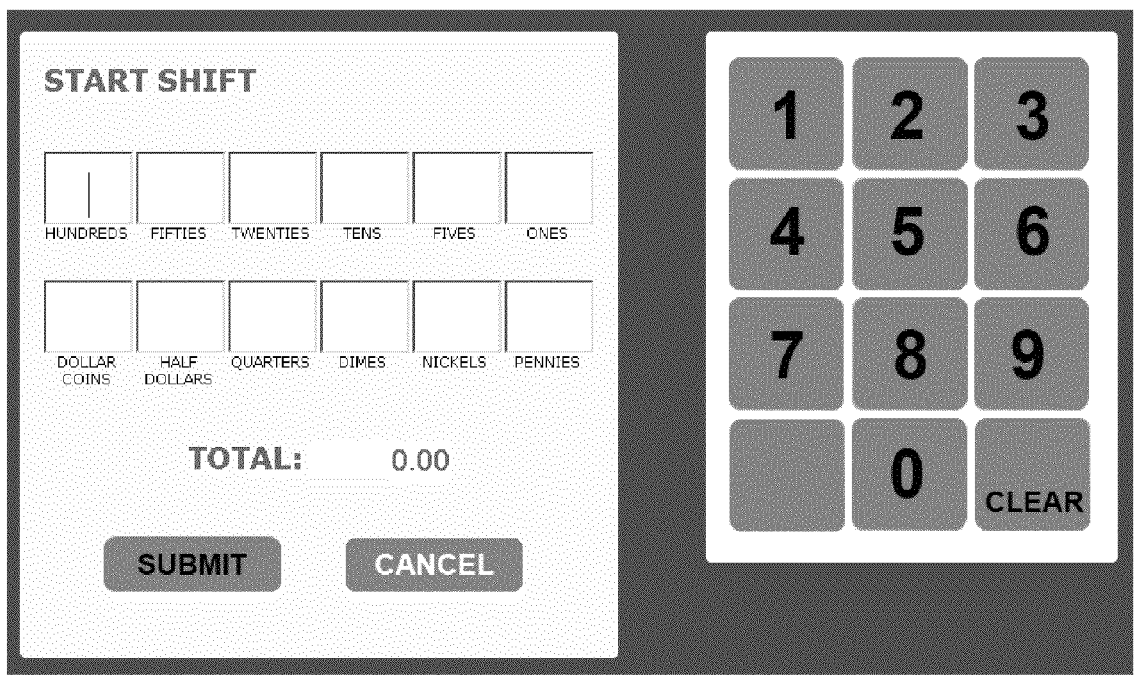
FIG. 8 is the user interface for inputting the cash tally into the Register.
Figure 9:
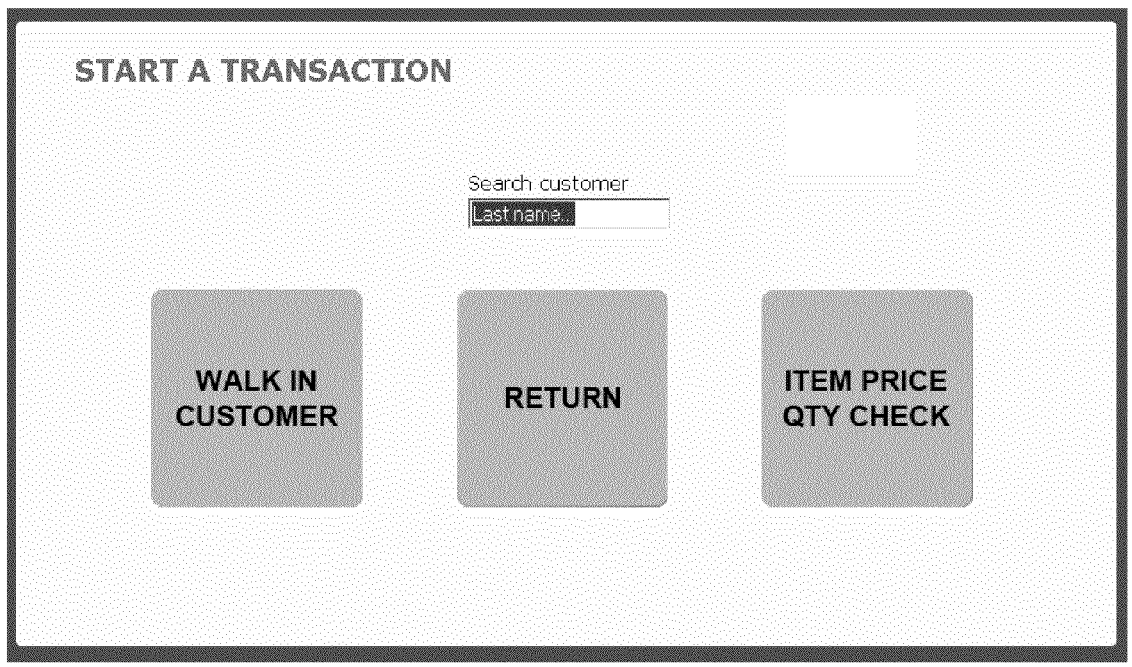
FIG. 9 is the user interface for conducting a transaction.
Figure 11:
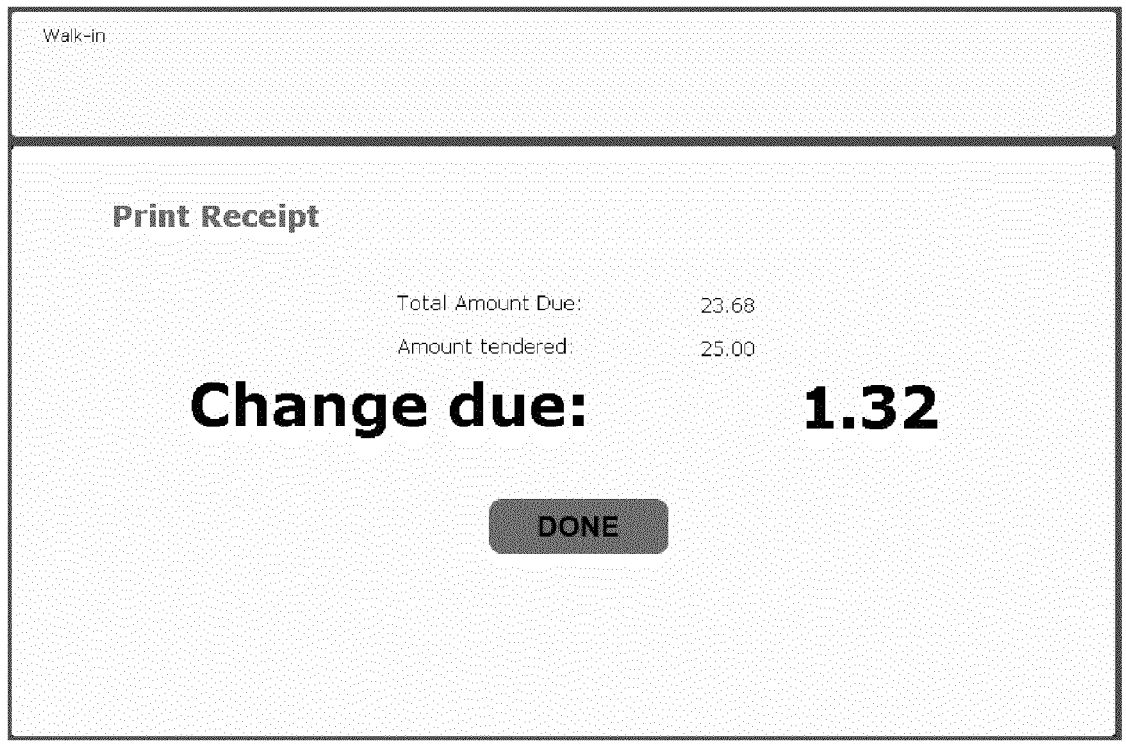
FIG. 11 is the user interface for a cash transaction.
Figure 12:
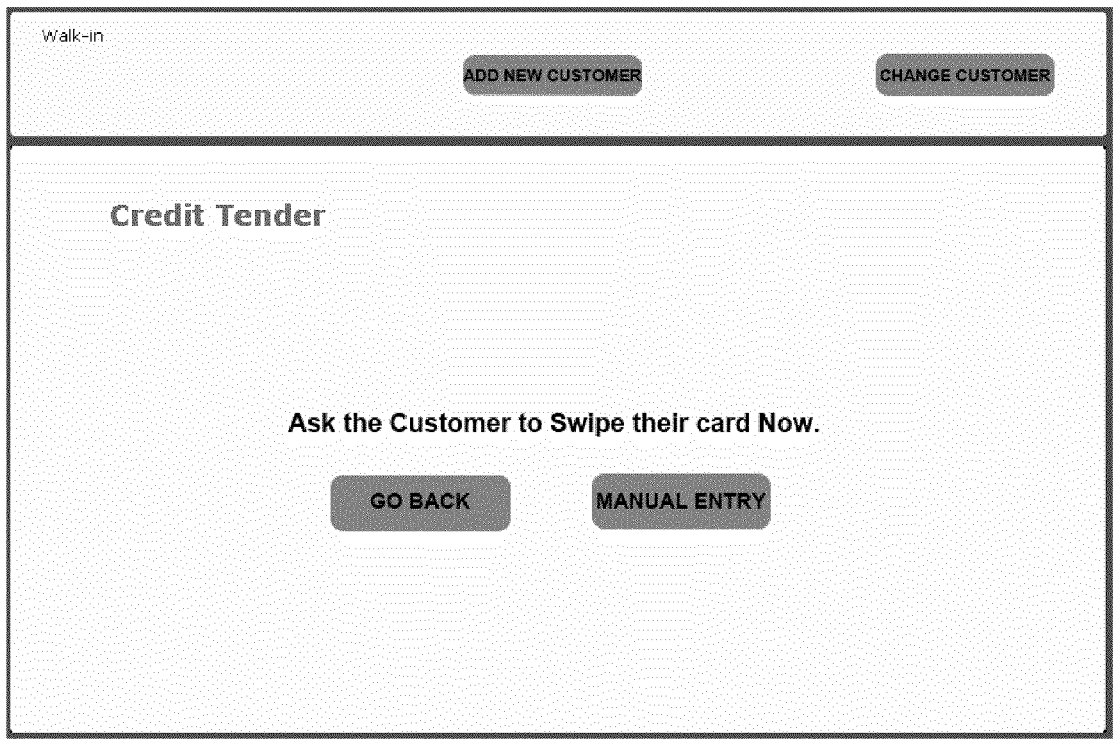
FIG. 12 is the display for showing change.
Figure 14:
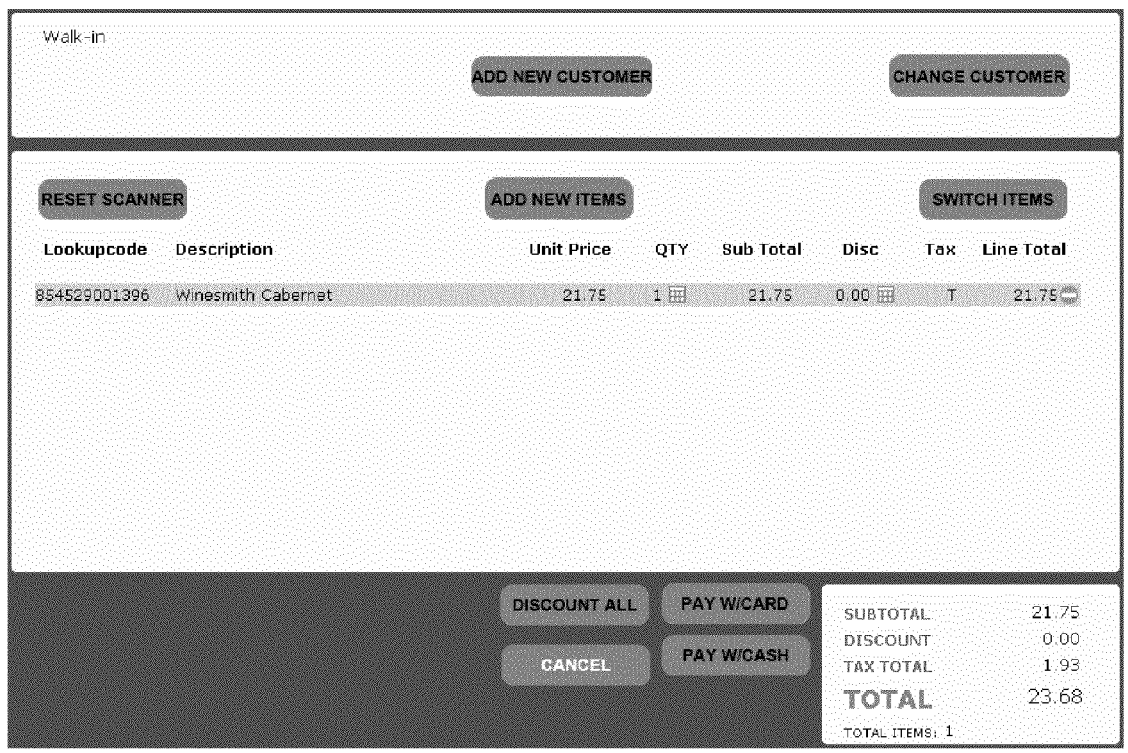
FIG. 14 shows the end of shift tally display.
Figure 15:
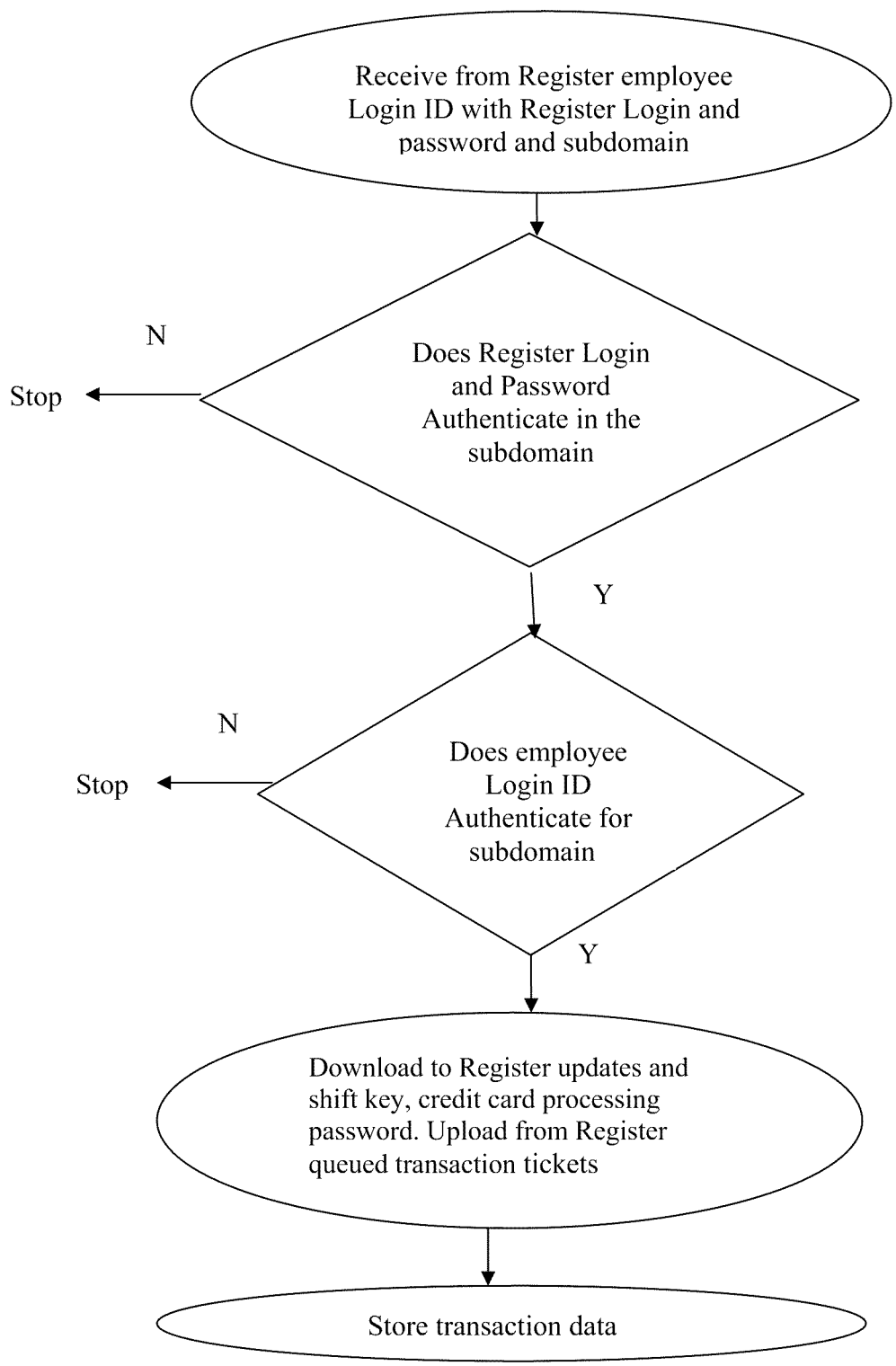
FIG. 15. Flow chart for shift start.

FIG. 3 shows the Back Office Architecture that the localhost 3000 accesses across the Internet. When the local web server operating as part of the register software is requested to process data that the web server needs the back office server to provide, the local web server executes the scripts that cause the local web server to assemble message packets, including the login and password for that Register instance and transmit them out across the Internet to the back office server. The Back Office server receives these message packets and then parses them. The login and password information is extracted and then confirmed. If confirmed, the rest of the message is executed. For example, a data message representing a message can be received, in which case the data message additionally contains the sub-domain, the amount of a transaction and the inventory item. The back office then updates the database entry in the subdomain with the appropriate change in inventory as well as revenue and cash present in the Register instance.

Account Mgmt: This component permits the authorized personnel of the vendor-customer, typically a manager, to log into the back office using an Internet browser and access the data associated with the one or more stores through the web services offered by that module. Inventory, sales history, customer history, reporting and all of the other data categories are available and presented using the scripts for convenient display on the browser.

Shopkeep AdminSvc. This service component is accessed by the operator of the system. Access can be provided by an Internet browser. A given vendor-customer's access to the system can be terminated or blocked or the data in that sub-domain installed, read, backed up or modified. This service also permits the operator of the invention to collect statistical data about sales and inventor activity managed using the system.

Database:

The repository is organized as one or more databases. In one embodiment, there is one database, and every data record is associated with a particular vendor by means of an entry in the data record indicating its owner. In another embodiment, each vendor using the system has a separate database of its own. In this latter approach, each database is housed on a server that is only accessible by a particular vendor or the service hosting the database for the vendor. In the preferred embodiment, each vendor has an individual subdomain uniquely identified with the client within the multi-tenant database. Using sub-domains within a database structure provides that the correct vendor information is mapped to the correct Register software clients.

The database is accessible using a web-browser by authorized users. This permits authorized personnel, including vendor personnel so authorized to review the activity of the Register instances associated with the vendor. The system, through the protocols with the Register instances permits the vendor personnel accessing the database through the web-interface to retrieve information from the Register instances that the vendor personnel request. The Register software and the system server protocols ensure that all queries into system database are limited to the sub domain associated with the Register instance, and prior to the query being executed, it check whether that session has been authenticated.

Network Robustness: An additional aspect of the invention is that the Register software, when it cannot access the servers due to a network problem, is designed to store transaction information locally and then transmit the information to the servers when the network is detected to be up again. At the same time, the database, when it attempts to update data locally on a Register instance and cannot because the network is down, will store the transaction data so that when the network is detected to be up again, the updated data is transmitted to the Register instance it was intended for. The servers also provide all the vendors payment clearance services.

Transaction Processing: The system servers connect the vendor's transactions to the credit card processor of their choice. This is accomplished by housing a credit card payment gateway on the system server. In the preferred embodiment, Plug n Pay™ is used as the credit card payment gateway. This subservice connects the system to a number of credit card processors. With this architecture, the transaction processing performed by the system for the vendors is simple: a transaction ticket that is received by the database sub-domain is used to update the sub-domain database, for example, decrementing the associated inventory and storing the credit card transaction. The system then translates the transaction, and through a standardized API (application programming interface), the appropriate payment process request is created, for example, containing the vendor name, any security code required, and the associated payment processor. This data request is then converted to drive the API presented by the credit card processing gateway. The gateway code module then transmits this information to the gateway service itself and the rest of the transaction is taken care of downstream from there. In another embodiment, the Register instance has the gateway login data and it assembles and transmits the credit card transaction directly to the gateway and transmits the continuing data up to the back office server.

Security is a major concern for a distributed point of sale service system. The first level of security is that the Register software is designed so that it cannot be tampered with. The second level is that the protocol interaction between the Register software instance and the servers across the Internet is encrypted and secured against tampering or interception. The third level of security is the access to the database from the Internet. It is essential that if the Register software protocol becomes known, that spoofing software cannot access the database by simulating the Register software protocol. In the preferred embodiment, all communication with the back office servers are using is HTTPS and SSL, no caching, encrypted transmission. In addition, each request for action transmitted from the Register instance contains the login and password associated with the Register instance. In another embodiment, the back office server checks that the Register number, login and password match up, and then process the request.

In important aspect of the invention is that the system servers are housed on the WAN, which in the preferred embodiment is the Internet. In this way, the system server can present a web-interface, like a web-server to authorized users. In this embodiment, an authorized user from a vendor can access a web-page with typical log-in and security access protocols. Once logged in to the system server, the web-page can take as input data query requests, and given the identity of the vendor, run database queries. The query results for that session are then transmitted out to the web-browser that requested them. As noted above, the queries are not run unless the log-in session is fully authenticated. This way, the system permits the vendor's personnel to check on the business operation from wherever an Internet connection is available.

The system architecture also makes possible new ways of electronically marketing a vendor's goods and services. For example, when a retailer adds an item to inventory, the system can automatically on selection cause an electronic image and announcement to be sent out to Twitter™ or another similar social network site as an announcement from the retailer. As an example, a wine merchant may have a Twitter account to which a number of customers are associated. When the Beaujolais Nouveau arrives in the store, the wine merchant, through a web-interface, will update the store inventory to include whatever number of cases have arrived. The system, when it detects that the retailer has updated inventory with a new item or replenished an item that had been sold out, can present the retailer the option, on the interface, to announce that fact. By clicking on a link, the system can then take the from the database the description of the item and then obtain from the database the twitter account information associated with the retailer. The system can also present an input box that permits the retailer to include a specific text message to be included. The system then automatically formulates a message, using the item description, logs into Twitter tm and then inputs the message. As a result, the arrival of the wine is announced to the customer group immediately. This system can also automatically export a photo and description to Twitter or another social site, enabling consumers to see it almost immediately.

In another embodiment, the system can be set to automatically scan the Internet for news items associated with text strings derived from the vendor's inventory database. As a result, when such a match is found, the system can deliver an electronic message to the retailer with a link to where the mention was found. As an example, the system can monitor a news ticker that automatically searches the Internet for mentions of products and descriptions in inventory—so the storekeeper would get an alert if, say, The New York Times ran a story about an item in stock, such as United Bamboo's limited edition cat calendar. In another embodiment, the system can provide an interface with other shopping social networking websites, like Foursquare™ or Milo.com™. In these cases, a search on those site for a particular item in a location is transmitted to the system as an external data query request. If a vendor has authorized the system to do so, the external query can be run within the system across the sub-domains of the vendors who permit this. When the item is found, the locality can then be checked. If the item and locality meet the query requirements, a message can be transmitted back to the requesting service that contains the identity of the vendor and their location. In addition, the message can contain a hyperlink to the vendor's website. A vendor can create a predetermined introductory message that can be retrieved from the vendor's subdomain that is then made part of the message.

Operating Environment:

The Register software operates as a local web stack, or web application, but the application runs locally on the computer operated as the cash register. The computer operates a browser, which in the preferred embodiment, is a prism browser with limited functionality. The browser accesses localhost3000, which runs the Mongrel web server application. The web server operates various code modules that are Ajax™ and Java™ scripts. Also running locally is a local database, for example, HeidiSql or mySql. By arranging the local software components as Ajax and Java scripts accesses locally, the platform is device independent. In one additional embodiment, the web application constituting the Register software instance can run on a hand-held computer, like an iPhone™ or Blackberry™ or similar so-called smartphone device.

The web server application also operates a background service that maintains interaction between the Register and the back office servers. When the Register processes a sale transaction, the background service is called to transmit the information to the back office computer. Likewise, when the back office updates its inventory or other variables relevant to the Register, the background service recognizes a request by the back office to update the data on the local computer and the updated is downloaded and stored.

In one embodiment, security is enhanced by encrypting the Ajax and Java script code. The installer program can take the unique numerical seeds derived from the hardware or some other password or user identifier to create a public/private encryption key pair that it uses to encrypt the code modules. The encrypting key is then erased. The decryption key is used to decrypt the code as it is requested to be run. This module can be inserted into the web server application so that it operates as a operating system service, which has enhanced security features as well.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet webbrowser and browser displays an interactive web page operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A method executed by a computer system comprised of at least one server that has a database that has at least one portion associated with at least one vendor of a plurality of vendors that utilize the database and a remote computer operating as a point of sale register terminal, said register terminal being connected to the server using a data network and said register terminal executing a register instance associated with a vendor that is one of the at least one vendors, said register instance being comprised of a data storage module for storing at least one transaction data comprised of inventory data, said transaction data being associated with a at least one sale transaction input into the register terminal comprising:

receiving through the data network data from the register instance transaction data comprised of inventory data associated with the at least one sale transaction input into the register terminal where the receiving transaction data step is performed automatically in response to the system detecting the condition that the data network connection between the register instance and the server has been restored;

receiving an authorization token through the data network data from the register instance;

executing automatically a computer security protocol that ensures that the register instance operating on the register terminal has access only to that portion of the database that is associated with the vendor that is associated with the register instance by confirmation that the received authorization token is associated with the vendor and in dependence on such confirmation, updating the portion of the database associated with the vendor associated with the register instance by using the received inventory data.

2. The method of claim 1 where the computer security protocol is adapted to service more than one register software instance controlled by a the vendor and each of the more than one register software instances is individually authorized by the computer security protocol to access the portion of the database associated with the vendor so that the collective inventory data received from the more than one register software instances associated with the vendor only modifies the portion of the database associated with the vendor.

3. The method of claim 1 further comprising:

transmitting data to the register terminal in order that the register terminal install the register instance program using the transmitted data;

upon installation of the register software instance on the register terminal, determining that the installed register software instance has not been tampered with by receiving an installation token from the installed register instance and running a process to confirm that the installation token is valid for the installed register instance, where the computer security protocol is further comprised of using the received authorization token to confirm that it is validly associated with the received installation token.

4. The method of claim 3 further comprising modifying a data value stored on the register terminal by the register software instance installation so that the installed register instance is only operable on that register terminal.

5. The method of claim 4 further comprising:

detecting hardware information describing one or more characteristics of the register terminal; using the detected hardware information to make a modification of the installed register instance program code.

6. The method of claim 1:

where the computer security protocol is comprised of verifying that the register instance meets pre-determined authentication requirements by the received authorization token being comprised of at least one identifiers associated with the register instance and running a database query to determine whether the at least one identifiers together are validly associated with the vendor.

7. The method of claim 6 where the identifiers are at least one of a name, password, sub-domain and register instance number.

8. The method of claim 1 where the receiving inventory data step is comprised of: receiving a transaction ticket comprised of data representing a register instance identifier, and an inventory item number.

9. The method of claim 1 further comprising:

automatically performing a data consistency check process that ensures a latest pricing and a latest inventory data stored in the portion of the server database associated with the vendor has been updated in the data storage module comprising the register terminal and that a latest inventory data stored on the register terminal has been updated in the portion of the server database associated with the vendor.

10. The method of claim 1 where the executing a computer security protocol step is further comprised of:

receiving an authorization token comprised of at least one message packet that is comprised of the login identifier for a register software instance and a request for data processing;

verifying that the login identifier for the register software instance is associated with the vendor associated with the register terminal; and in response to the verification, executing the data processing requested by the received message packet.

11. The method of claim 1 further comprising:

using a computer to automatically and in response to the vendor updating the vendor's portion of the server database using data representing the addition of an item to inventory, a change in the amount of inventory of an item or a change in the price of an item,-transmitting an electronic message to the register instance embodying a notice that such inventory item has been added, such amount has been changed or such price has been changed.

12. The method of of-Claim 1 further comprising:

using a computer to automatically scan at least one website hosted on a server attached to the data network to detect text strings on the website that sufficiently match at least one text strings derived from the names of inventory items stored in the vendor's portion of the server database; and in response to detecting a sufficient match delivering an electronic message to a predetermined recipient that includes a link to the website where the detected matching text string was found.

13. The method of claim 2 further comprising:

receiving a data message embodying a request to locate a vendor within a geographic area with an item of inventory, the area and item being specified in the request in the form of data values in the data message;

using a computer to formulate a query using the data values and to run the query on at least one of the portions in the database associated with the plurality of vendors to locate at least one vendor of the at least one vendors that meets the requirements of the request;

transmitting a data message embodying a response to the received request that includes the identity of the at least one located vendor.

14. A system for managing retail inventory data associated with a sale transaction comprising:

a plurality of register software instances operating on a corresponding plurality of first computers said register instance being comprised of a data storage module for storing at least one transaction data comprised of inventory data, said transaction data being associated with at least one corresponding sale transaction input into the register terminal, each of the plurality of first computers controlled by a distinct corresponding owner and further adapted to transmit to a server over a data network connected to the first computers a corresponding plurality of transaction data comprising inventory data associated with a plurality of corresponding sale transactions input into the corresponding plurality of first computers and to transmit to the server a corresponding plurality of authorization tokens where the server connected to the plurality of first computers—using the data network is further adapted to receive the plurality of transmitted transaction data comprised of—inventory data and the corresponding plurality of authorization tokens;

a database connected to the servers, said database configured to have a plurality of portions corresponding to each of the plurality of distinct owners; wherein the server is further configured to execute a computer security protocol to ensure that each of the plurality of register software instances operating on each corresponding first computer only have access to the portion of the database that is associated with the corresponding owner of the register instance by verifying that the received authorization token associated with each received inventory data is validly associated with the owner corresponding to the register instance that transmitted the transaction data comprised of—inventory data and in dependence on such verification, only modifying the portion of the database associated with the owner corresponding to the verified authorization token using the transaction data comprised of—data received from the register instance associated with the owner corresponding to the verified authorization token, wherein the system is configured so that in response to detecting the condition that the data network connection with the server and at last one register instance being restored from an interruption, transmitting the at least one locally stored transaction data to the server from the at least one register instances whose connection has been restored.

15. The system of Claim 14 wherein the server is configured to store locally on the server transaction data comprised of—inventory data to be transmitted to at least one of the plurality of register software instances where the data network connection to such register instances has been interrupted and in response to the system detecting the condition that the data network connection has been restored from the interruption, to transmit the transaction data comprised of -inventory data stored locally on the server to the at least one of the register software instances whose data connection has been restored.

16. The system of claim 14 where the system is configured to perform a data consistency check process that ensures that the latest pricing and inventory data associated with at least one of the plurality of vendors that is stored in the portion of the database associated with the vendor has been transmitted to and updated in the register software instances corresponding to the vendor and that the latest inventory data stored locally by the at least one of the register software instances associated with the vendor has been received by the server and updated in the portion of the database corresponding to the vendor.

17. The method of claim 9 where the performing a data consistency check step is initiated automatically by the system upon detection of the condition that the data network connection between the register software instance and the server has been restored.

18. A non-transitory computer readable data storage device comprised of data, that when loaded into a computer and executed causes the computer to perform any of the methods of claim 1-8 or 9 or 17.

19. The system of claim 16 where the system is further adapted to perform the data consistency check upon detection of the condition that the data network connection between the server and the at least one of the register software instances associated with the vendor has been restored from an interruption.

* * * * *